US006591288B1

(12) United States Patent
Edwards et al.

(10) Patent No.: US 6,591,288 B1
(45) Date of Patent: Jul. 8, 2003

(54) DATA NETWORK ACCELERATED ACCESS SYSTEM

(75) Inventors: Keith Russell Edwards, Paignton (GB); Richard John Driscoll, Totnes (GB)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/081,004

(22) Filed: May 19, 1998

(51) Int. Cl.[7] ............................................. G06F 15/16
(52) U.S. Cl. ....................... 709/203; 709/219; 709/217; 370/335
(58) Field of Search .................. 709/217–219, 709/203, 223, 224, 225, 228, 229, 231, 232; 370/336, 338, 913, 335, 337; 707/500; 379/93.01, 92.01, 1.01; 455/524

(56) References Cited

U.S. PATENT DOCUMENTS

| 5,913,033 A | * | 6/1999 | Grout | 709/219 |
| 5,930,472 A | * | 7/1999 | Smith | 709/203 |
| 5,956,391 A | * | 9/1999 | Melen et al. | 379/114 |
| 6,012,083 A | * | 1/2000 | Savitzky et al. | 709/202 |
| 6,029,175 A | * | 2/2000 | Chow et al. | 707/104 |
| 6,112,206 A | * | 8/2000 | Morris et al. | 707/10 |
| 6,138,158 A | * | 10/2000 | Boyle et al. | 709/225 |

FOREIGN PATENT DOCUMENTS

| EP | 0837401 | 4/1998 | G06F/17/24 |
| EP | 0837584 | 4/1998 | H04L/29/06 |
| WO | WO 96/34340 | 10/1996 | G06F/13/14 |
| WO | WO 97/30403 | 8/1997 | G06F/17/30 |
| WO | WO 97/44747 | 11/1997 | G06F/17/30 |

OTHER PUBLICATIONS

PeakSoft Corporation Internet Homepage (See Attached Listing).
IMSI Net Accelerator Internet Pages (See Attached Listing).

* cited by examiner

Primary Examiner—Mark R. Powell
Assistant Examiner—Beatriz Prieto
(74) Attorney, Agent, or Firm—William M. Lee, Jr.; Barnes & Thornburg

(57) ABSTRACT

An accelerated access system for a computing device, in which the computing device is connected to a first data network, such as the Internet, via a second data network such as a wireless telecommunication network. The system comprising a server for downloading data from the first data network before that data has been requested by a user of the computing device and a cache for storing the downloaded data. For example, during browsing of the Internet by a user of the computing device the server downloads data linked to an Internet site being displayed by the computing device for storage in the cache. Then when a user subsequently requests the data stored in the cache it appears on the screen of the computing device faster than it would take to access it from the Internet. The system is located between the first data network and the second data network so that not all of the data downloaded by the server and only requests for data made by a user of the computing device are transmitted over the second data network.

17 Claims, 4 Drawing Sheets

DATA NETWORK ACCELERATED ACCESS SYSTEM

FIELD OF THE INVENTION

This invention relates to a system for providing accelerated access to a first data network via a second data network where the second data network is a packet switched network or other type of network which is designed to transmit bursty data. In particular this invention relates to a system for providing accelerated access to the Internet or an internal company run Intranet via a wireless telecommunications network.

FIELD OF THE INVENTION

Fixed wireless access systems are currently employed for local wireless telecommunication networks, such as the IONICA system. Known systems comprise radio transceivers which are located at subscriber's premises. The radio transceivers at the subscribers premises communicate by radio link with a base station, which provides cellular coverage over, for example, a 5 km radius in urban environments. A typical base station will support 500–2000 subscribers. Each base station is connected to a standard PSTN switch via a conventional transmission link/network. Thus subscribers are connected to a national telecommunications network by radio link using a wireless telecommunication network in place of the more traditional method of copper cable. Fixed wireless access systems are capable of delivering a wide range of access services from POTS (public operator telephone service), ISDN (integrated services digital network) to broadband data.

Subscribers having a computing device, such as a PC connected via a modem to a wireless telecommunication network, such as the fixed wireless access system described above may wish to access data networks, such as the Internet.

Referring to FIG. 1, when a request for a link to the Internet (2) is made at the subscriber's PC (4), the signal generated is communicated via the PC's modem (6) to a decoder (8), where it is encoded and then transmitted over a wireless telecommunications network by the subscriber unit's antenna (10) to the associated antenna (12) of a base station (14—indicated by dotted lines) which serves the subscriber unit (16—indicated by dotted lines). At the base station the signal is decoded by a decoder (18) and then transmitted in the conventional way via a standard circuit switched PSTN system (20) to the Internet (2). Similarly, when information is received from the Internet, it is transmitted over the PSTN system to the relevant base station (14) where it is encoded by decoder (18) and transmitted over the network by the base station antenna (12) to the antenna (10) at the subscriber's premises. The information is then decoded at the subscriber's premises by the decoder (8) and transmitted to the PC (4) via the PC's modem (6).

The wireless telecommunications network described above is a packet switched data network and as such is designed to carry intermittently transmitted packets of information (ie bursty data) from a particular subscriber to its associated base station and vice versa, as opposed to a continuous stream of information. For example, during Internet browsing when a subscriber's PC requests the next link or moves to another site on the Internet, this is transmitted between the subscriber's antenna and the base station antenna as one or more discrete packets of high bandwidth signal. There is then likely to be a long gap until the user requests a further link. Similarly, when an Internet page is downloaded onto the subscriber's PC from the Internet, the information associated with that page is transmitted between the base station antenna and the subscriber unit's antenna as one, or more likely a plurality, of packets of high bandwidth signal. Again, there is then likely to be a long gap, while the user assesses the current page until a next requested page is downloaded. For example, during normal browsing of the Internet a subscriber's modem may be idle up to 90% of the time and so information would be transmitted between the subscriber unit's antenna and a base station antenna only 10% of the time during which the user is browsing.

Recently, so called Internet accelerators or accelerated access systems have become very popular, for example the "PeakJet" package which is available from The PeakSoft Corporation and the "Net Accelerator" package which is available from IMSI. These packages operate on a computing device, such as a PC, and speed up or accelerate access to Internet pages by scanning ahead when, during browsing, a user's modem is idle and downloading onto the user's PC those pages and associated graphics which are linked to the page currently being displayed on the PC screen and being read by the user. The downloaded links are then stored as a cache (24—see FIG. 1) in the PC's (4) hard disk. When the user, finishes reading the current page and requests a link to a linked Internet page, it should appear on the PC screen immediately because it should already stored in the cache (24) in the PC's hard disk. That is provided that the Internet accelerator has had time to download that particular linked page into the cache during previous idle time.

Since many unused linked pages are downloaded, the modem (6) is working almost continuously. Inevitably, many of the pages loaded by the Internet accelerator into the cache (24) will not be requested by a user and so will have to be discarded later.

The Internet accelerated access packages described above have an intelligent caching system which learns from the PC user's Internet browsing activities, those Internet pages or sites the user accesses most frequently. Then when the modem is idle the Internet accelerating system will access these most frequently accessed pages and update the cache with recent changes which have been made to them. Therefore, when a user next requests to access one of the most frequently used pages, the up to date page is displayed on the PC screen almost immediately and less time is spent waiting for the page to be accessed from the Internet by the browser. Even if the most frequently used page has not yet been updated and so is not completely up to date, all that the Internet acceleration package needs to request is a relatively small amount of information required to update the page, which will take less time to be downloaded from the Internet onto the PC than the entire page.

When a subscriber to a wireless telecommunication network, as shown in FIG. 1, uses an Internet accelerator, the PC's modem (6) will be operating almost constantly and so the subscriber unit's antenna (10) will be transmitting and/or receiving almost continually. Similarly, the base station antenna (12) will be transmitting and/or receiving to/from the subscriber unit almost continuously. This is not consistent with the fact that such wireless telecommunication networks are packet switched networks and as such are designed to carry intermittently transmitted packets of information to and from a subscriber. Although it may not be too much of a problem for a circuit switched network (eg. PSTN), the continual transmission of data packets to and from a subscriber can be very harmful to the performance of a packet switched network where data has been assumed to be very "bursty". In a wireless telecommunication network for carrying data or a mix of voice and data, Internet accelerated access systems can cause serious congestion.

Although the above example relates to accessing the Internet using an Internet accelerated access package via a wireless telecommunication network, it will be apparent that similar problems will be experienced when trying to access a first data network, using a network accelerated access package which scans ahead and downloads network sites before they are requested, via a second data network where the second data network is a packet switched network or other type of network which is designed to transmit bursty data.

OBJECT OF THE INVENTION

The present invention seeks to provide an accelerated access system which overcomes or at least mitigates one or more of the problems noted above.

The present invention further seeks to achieve a high speed of access to a first data network, in particular the Internet, which is comparable to that provided by known accelerator packages in the situation where a user is connected to the first data network via a second packet switched or other type of bursty data network, in particular a wireless telecommunication network, while preventing congestion of the second data network.

SUMMARY OF THE INVENTION

According to a first aspect of the present invention there is provided an accelerated access system for a computing device, which computing device is connected to a first data network via a second data network, the system comprising a server for downloading data from the first data network before that data has been requested by a user of the computing device and a cache for storing the downloaded data, wherein the system is located between the first data network and the second data network.

Only some of the information which is downloaded by the server from the first data network will subsequently be requested by a user of the computing device during interrogation of the first data network. By locating the accelerated access system between the first data network and the second data network it is not necessary to transmit all the data downloaded by the server over the second data network. Instead only that information requested by a user of the computing device is transmitted over the second data network at high speed from the cache. This prevents the second data network from becoming congested while still providing a high speed of access to the first data network.

The first data network may be the Internet or an internal company run Intranet and the second data network may be a wireless telecommunication network.

According to a second embodiment of the present invention there is provided an accelerated access system for a computing device, which computing device is connected to a first data network via a second data network, the system comprising a server for downloading data from the first data network before that data has been requested by a user of the computing device and a cache for storing the downloaded data, wherein the system is located remotely from the computing device such that signals transmitted between the computing device and the server are transmitted over the second data network.

Again the first data network may be the Internet or an internal company run Intranet and the second data network may be a local wireless telecommunication network.

According to a third embodiment of the present invention there is provided an accelerated access system for a computing device, which computing device is connected to a subscriber unit of a wireless telecommunication network and the subscriber unit is in radio communication with a base station of the wireless telecommunication network, the system comprising a server for downloading data from a first data network before that data has been requested by a user of the computing device and a cache for storing the downloaded data, wherein the system is co-located with the base station.

The first data network may be the Internet or an internal company run Intranet.

At any time during interrogation or browsing of the first data network or the Internet by a user of the computing device preferably the server is set up to download data linked to a network site of the first data network or an Internet site being displayed at that time by the computing device for storage in the cache.

Preferably, the server monitors the requests for data from the first data network or the Internet made by its users and automatically downloads the most frequently requested data for storage in the cache. The server can then be arranged to automatically update the most frequently requested data. Alternatively, the server may update the most frequently requested data when a user requests that data.

The system may be set up to support a plurality of computing devices which are all linked to the first data network via the second data network.

BRIEF DESCRIPTION OF THE DRAWINGS

In order that the present invention is more fully understood and to show how the same may be carried into effect, reference shall now be made, by way of example only, to the figures as shown in the accompanying drawing sheets, wherein.

DETAILED DESCRIPTION OF PREFERRED EMBODIMENTS

Figure 2:
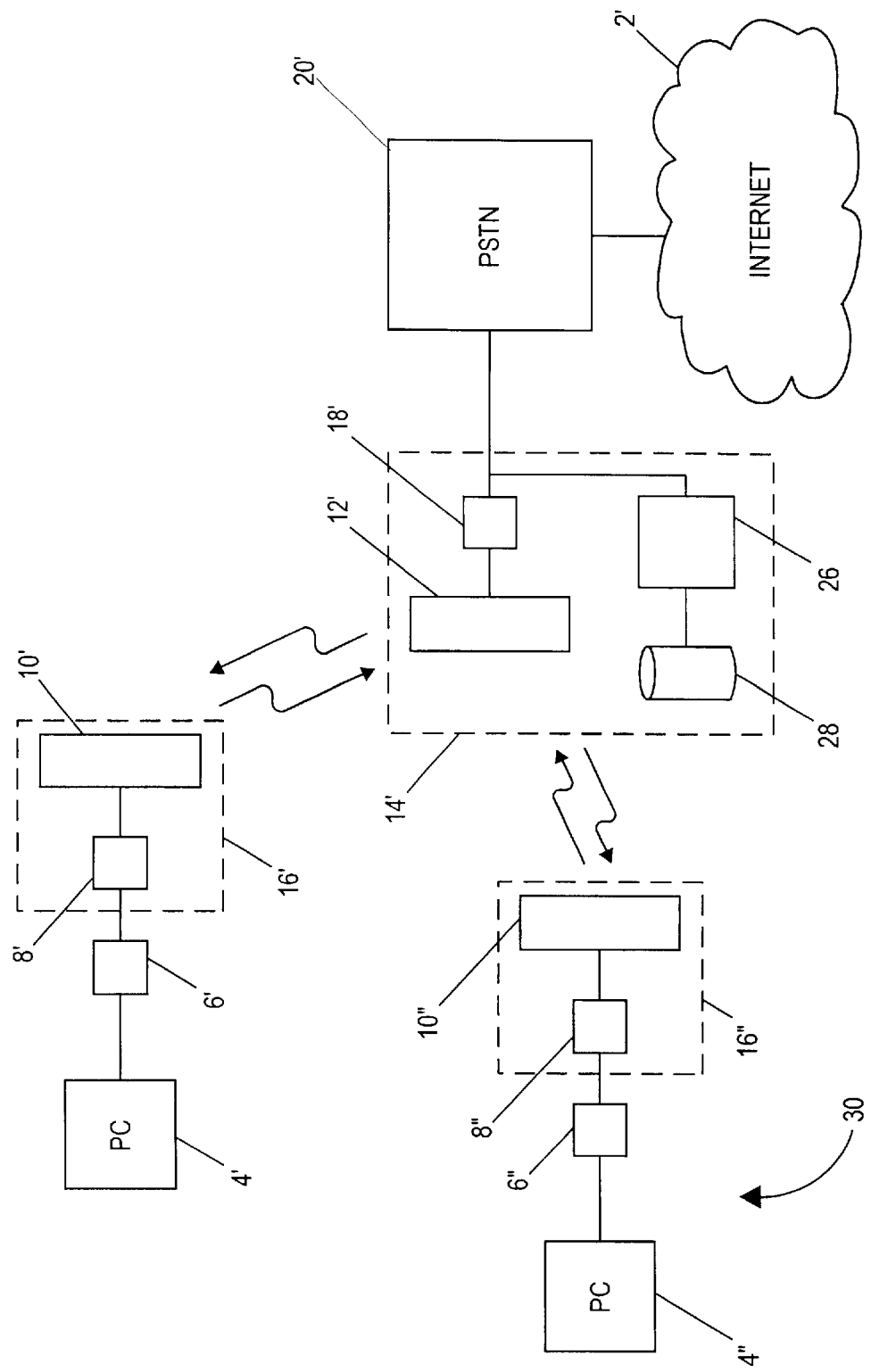
FIG. 2 shows a schematic representation of a computing device, such as a PC, connected to the Internet via a fixed wireless access network in which the PC is served by a high speed internet access system according to the present invention.

Referring now to FIG. 2, a computing device, such as a PC (4') is connected to a wireless telecommunication network via a modem (6').

Figure 1:
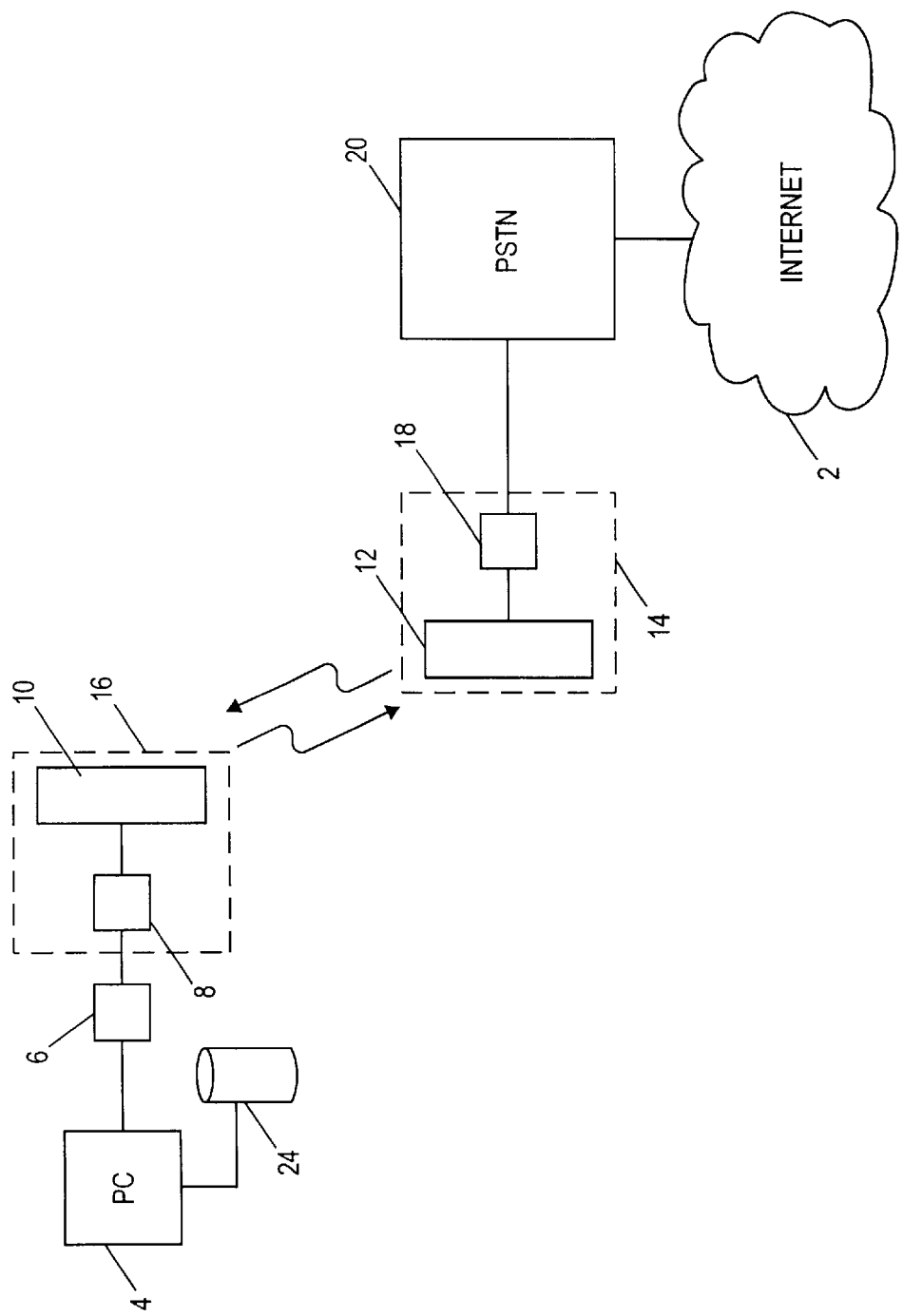
FIG. 1 shows a schematic representation of a computing device, such as a PC, connected to the Internet via a fixed wireless access network in which the PC is set up with a conventional web accelerator.

In the base station (14') of the arrangement shown in FIG. 2 there is provided an accelerated access system (26, 28) or Internet accelerator which is moved from the user's PC (as in FIG. 1) to the base station (14') in accordance with the present invention.

When a subscriber to the network (also referred herein as a user of the PC (4')) uses the PC (4') for browsing the Internet and makes a request for a link on the Internet (2'), the request is transmitted via the PC's modem (6') and is encoded by the decoder (8') of the subscriber unit (16') and then transmitted by the antenna (10') of the subscriber unit to the base station (14') which serves the subscriber. The signal received by the antenna (12') of the base station (14') is then decoded by decoder (18') and intercepted by the server (26). When in response to the request the server (26) sends an Internet page to the PC user, it is transmitted to the base station (14'). At the base station the signal is encoded by decoder (18') and transmitted by antenna (12') to the antenna (10') of the subscriber unit (16'). The signal received by antenna (10') is then decoded by decoder (8') and downloaded by the PC (4') via the modem (6').

The accelerated access system comprises a computer or server (26) which runs software to provide high speed or accelerated access for all PC's (4',4") who have modems (6',6") which are connected to subscriber units (16',16") which are supported by the base station (14'). It also comprises a cache (28) for storing Internet pages downloaded from the Internet by the server (26). Therefore, a single accelerated access system according to the present invention supports a plurality of Internet users. For example, in FIG. 2 a second subscriber unit, modem and PC arrangement (30) is shown which is supported by the accelerated access system (26,28) of the base station (14').

When a subscriber using the base station accelerated access system browses the Internet the requests made by the PC (4') and the Internet pages downloaded on to the PC (4') are communicated via and monitored by the server (26). The server provides accelerated access to the Internet by scanning ahead and downloading into the cache (28) those pages and associated graphics which are linked to the page currently being displayed on the screen of the PC (4') and being read by the user. When the user, having finished reading the current page, subsequently requests a link to a linked Internet page, it is transmitted to the PC (4') from the cache (28) by the server (26) from the base station (14') to the subscriber unit (16') (provided of course that there has been sufficient idle time to enable the server (26) to download the requested linked page). Because the information is already downloaded from the Internet and stored in the cache (28) it reaches the PC (4') much more quickly than if it had to be accessed and downloaded to the PC (4') from the Internet (2').

Figure 3:
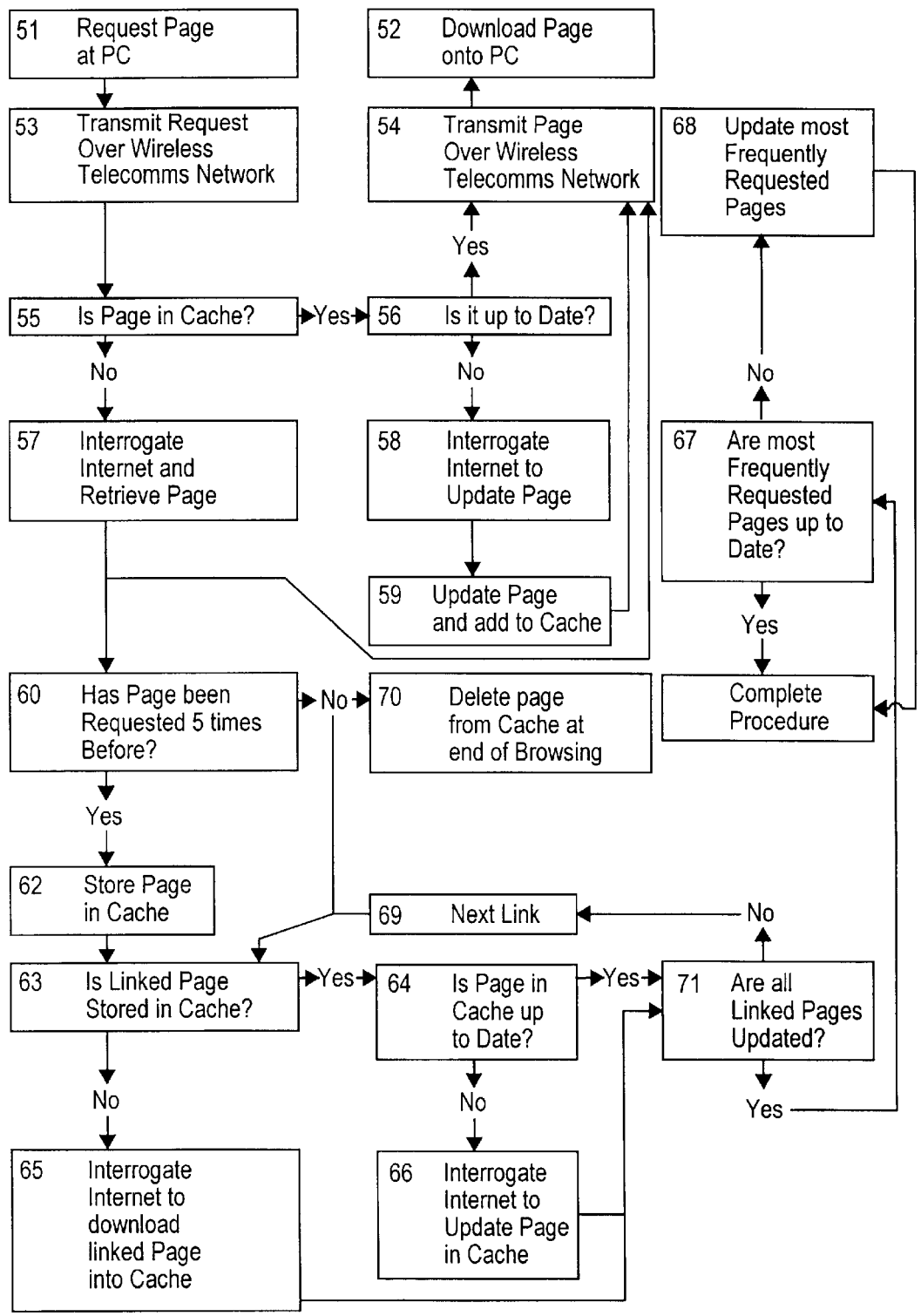
FIG. 3 shows a flow chart of the sequence of operation of an accelerated access system according to the present invention.

Referring now to FIG. 3 (the flow chart boxes of which are identified below in square brackets), when a subscriber/user makes a request at a PC (4') for a page from the Internet [51] the request is transmitted over the wireless telecommunications network [53] to the base station (14') as described above. The server (26) will intercept this request and determine whether the requested page is already stored in the cache (28) [55]. If it is stored in the cache then the server (26) determines whether the requested page stored in the cache is up to date [56]. If it is up to date the page is downloaded from the cache (28) and transmitted by the base station (14') over the wireless telecommunication network to the subscriber unit (16') [54] and downloaded onto the PC (4) [52]. If the requested page is in the cache (28) but is not up to date the server interrogates the Internet to update the requested page [58] stores the updated page in the cache (28) [59] and the up to date requested page is downloaded from the cache (28) and transmitted by the base station (14') over the wireless telecommunication network to the subscriber unit (16') [54] and downloaded onto the PC (4) [52].

Going back to box [55], if the requested page is not stored in the cache (28) the server (26) interrogates the Internet to retrieve the requested page [57]. The server downloads the retrieved requested page and then determines how many times the retrieved requested page has been requested previously [60] and if the retrieved requested page has been requested by a user five times before then the requested page is stored in the cache (28) as a most frequently requested page [62]. Whether the requested retrieved page is a most frequently requested page or not it is transmitted by the base station (14') over the wireless telecommunication network to the subscriber unit (16') [54] and downloaded onto the PC (4) [52].

If a requested and retrieved Internet page [57] is not a most frequently requested page it is deleted from the cache when the user ends the Internet browsing session [70].

The server then proceeds with the remaining steps shown in FIG. 3 until either the procedure is completed or the steps are interrupted by a further request for an Internet page from the PC user, in which case the server jumps back to box [55].

If uninterrupted, the next step is for the server (26) to determine on a link by link basis whether the pages linked on the Internet to the requested page (which is now being assessed by the user) is stored in the cache (28) [63]. If it is then the server (26) determines whether the first linked page in the cache is up to date [64]. If the first linked page in the cache is up to date the server goes onto the next linked page [69 via 71]. If the first linked page is in the cache but is not up to date the server (26) interrogates the Internet to update the linked page in the cache [66] and when the first linked page is up to date the server goes on to the next linked page [69 via 71]. If the first linked page is not stored in the cache (28) then the server (26) interrogates the Internet to download the first linked page [65] and then goes onto the next linked page [69 via 71]. This continues until all the linked pages are stored [71].

When a download request is made by the subscriber's PC a channel on the wireless telecommunication network between the base station (14') and the subscriber unit (16') is rapidly set up to transmit the data comprising the request. Alternatively, an existing low data rate channel can be rapidly upgraded to a high data rate and the data (in compressed form where applicable) is sent over the network.

Using an accelerated access system located at the base station as described above means that only the requests that are made by the PC users (subscribers) and only the information that is requested by the PC users are transmitted over the wireless telecommunication network, substantially reducing the chances of congestion on the network.

The accelerated access system according to the present invention may have an intelligent caching system which learns from the activities of the plurality of PC users (subscribers) it supports. Those pages or sites which the users access most frequently are regularly updated by the server (26). The server (26) can update favourite pages either during idle time when the user of the favourite page is browsing or alternatively on a regular basis when the user is off line. Therefore, when one of the users next requests to access one of the most frequently used pages, the up to date page is transmitted from the cache (28) by the server (26) from the base station (14') to the subscriber unit (16') and is displayed on the PC screen almost immediately and less time is spent than waiting for the page to be accessed on the Internet.

For example, referring to FIG. 3, when the server (26) has determined that all pages which are linked to the requested page currently under review by the user are stored in the cache (28) in an up to date manner [71] then it will proceed to update the most frequently requested pages. The server will determine whether the most frequently addressed pages are up to date [67]. If they are the procedure of FIG. 3 is completed and the server will wait for the next request from a user for an Internet page. If they are not updated the server (26) will systematically update the most frequently requested pages [68].

Figure 4:
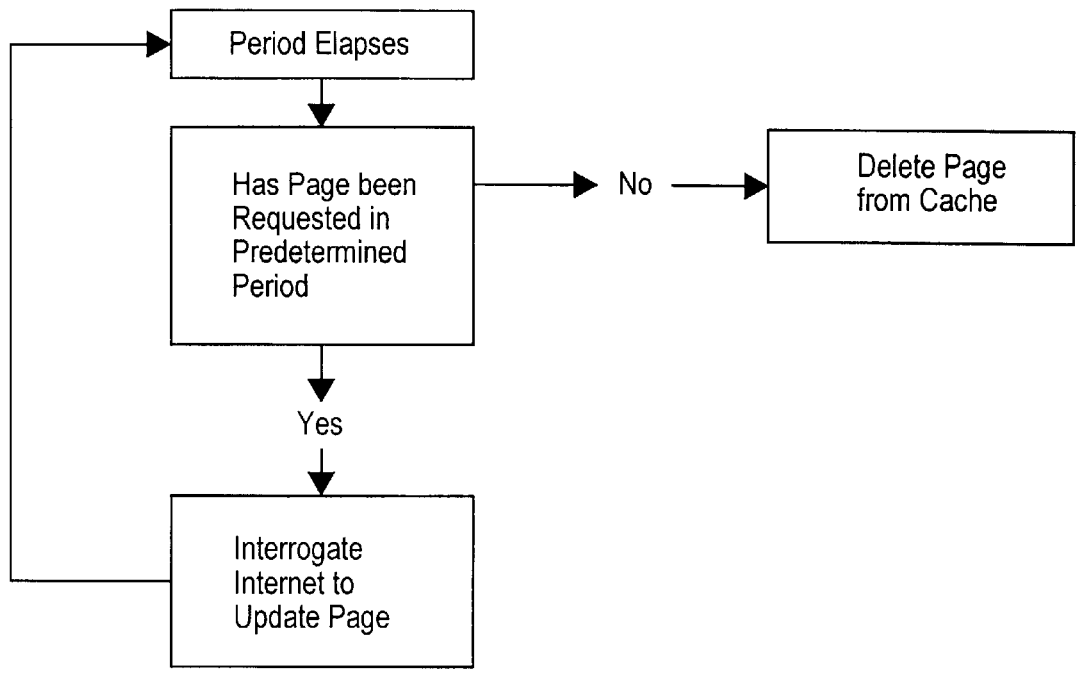
FIG. 4 shows a flow chart of the sequence of operation for periodically updating the cache of an accelerated access system according to the present invention.

Alternatively, steps [67 and 68] can be omitted from the procedure of the server (26) shown in FIG. 3 and the server can be arranged to update the most requested pages at regular intervals, when the user is not on line. A procedure for this is shown in FIG. 4. The server (26) is arranged to monitor and download into the cache all requests for Internet pages made by users supported by the base station (14'). Periodically, for example on a daily basis or after each browsing session of a user [80], the server (26) will determine which of the most frequently requested pages which it has stored in the cache have not been requested for a predetermined length of time, for example 30 days [81]. The pages which have not been requested for the predetermined length of time will be deleted from the cache (28) [82] and the remaining pages will be updated by the server (26) by interrogation by the server of the Internet [83].

At the server (26) for each user a record is kept of the Internet pages they most frequently visit. When a user joins the system the server (26) monitors the user's Internet browsing and when the links to the favourite Internet pages become apparent, for example by requests for the same Internet page on several occasions, they are saved in the cache (28) (see FIG. 3) and then regularly updated until it becomes apparent that this page has ceased to be a favourite page, for example by no requests being made to this page during several browsing sessions. If a favourite page is already stored in the cache (28), for example because it is the favourite page of another user, then no additional request for this page to be downloaded is made. In this way there are no multiple copies of data stored by the server (26) in the cache (28) of a particular base station (14').

Even if a requested most frequently used page is not completely up to date, all that the server (26) needs to request is a relatively small amount of information required to update the page, which will take less time to be downloaded onto the PC from the Internet than the entire page.

If a subscriber's (user's) PC accesses the Internet via a base station having an accelerated access system according to the present invention then if the PC is itself operating web acceleration software, this software must be disabled in some way. Accordingly, at the start of each web session of a subscriber a test is made to determine if the subscriber's PC is operating web acceleration software. If so a message is sent from the server (26) to the subscriber's PC to disable the automatic requests made by the web acceleration software from being transmitted over the wireless network so that only genuine requests made by the user of the PC are transmitted over the network.

What is claimed is:

1. An internet access system for a computing device, which computing device is connected to a subscriber unit of a wireless telecommunication network and the subscriber unit is in radio communication with a base station of the wireless telecommunication network, the system comprising a server for downloading data from a first data network and for downloading data linked to said downloaded data before said linked data has been requested by a user of the computing device and a cache for storing said downloaded data and said downloaded linked data, wherein the system is located on a base station side of a wireless link connecting the subscriber to the base station and wherein said server is operable to determine if the subscriber's computing device is operating web acceleration software and to send a message to the subscriber's computing device to disable automatic data requests made by the subscriber's web acceleration software if it is determined that such software is operating on the subscriber's computing device.

2. A system according to claim 1, wherein the server monitors the requests for data from the first data network made by a user of the computing device and automatically downloads the most frequently requested data for storage in the cache.

3. A system according to claim 2, wherein the server periodically updates the most frequently requested data.

4. A system according to claim 2, wherein the server updates the most frequently requested data when a user of the PC requests that data.

5. A system according to claim 1, wherein the system supports a plurality of computing devices.

6. A system according to claim 1, wherein the first data network is the Internet.

7. A system according to claim 6, wherein the server monitors the requests for data from the Internet made by a user of the computing device and automatically downloads the most frequently requested data for storage in the cache.

8. A system according to claim 7, wherein the server periodically updates the most frequently requested data.

9. A system according to claim 7, wherein the server updates the most frequently requested data when a user of the PC requests that data.

10. A system according to claim 6, wherein the system supports a plurality of computing devices.

11. A system according to claim 6, wherein at any time during browsing of the Internet by a user of the computing device the server downloads data linked to an Internet site being displayed at that time by the computing device.

12. A system according to claim 1, wherein at any time during interrogation of the first data network by a user of the computing device the server downloads data linked to a network site of the first data network being displayed at that time by the computing device.

13. A system according to claim 1, wherein the server executes the step of determining if a subscriber's computing device is operating web acceleration software at the start of each subscriber web session.

14. A base station for a wireless telecommunication network, said base station being in radio communication with a subscriber unit and being operable to process internet data requests of a subscriber's computing device connected to the subscriber unit, the base station including a server for downloading data from a first data network and for downloading data linked to said downloaded data before said linked data has been requested by a user of the computing device and a cache for storing said downloaded data and said downloaded linked data, wherein said server is operable to determine if the subscriber's computing device is operating web acceleration software and to send a message to the subscriber's computing device to disable automatic data requests made by the subscriber's web acceleration software if it is determined that such software is operating on the subscriber's computing device.

15. A base station according to claim 14, wherein the server executes the step of determining if a subscriber's computing device is operating web acceleration software at the start of each subscriber web session.

16. A method of processing internet data requests from a user of a computing device connected to a subscriber unit of a wireless telecommunication system, comprises the steps of:

receiving at a base station over a wireless link connecting said subscriber to a base station of the network a request to access an internet data source;

at a server located on a base station side of said wireless link, determining from said access request whether the user's computing device is operating web acceleration software and, if it is so determined, sending a message from the server to the user's computing device to disable automatic data requests made by the subscriber's web acceleration software;

at the server downloading data linked to said downloaded data before said linked data is requested by the user; and storing said downloaded linked data in a cache.

17. A method according to claim 16, wherein it includes the step of the server determining if the subscriber's computing device is operating web acceleration software at the start of each subscriber web session.

* * * * *